US007330841B2

(12) United States Patent
Cochran et al.

(10) Patent No.: US 7,330,841 B2
(45) Date of Patent: Feb. 12, 2008

(54) MODELING DECISION MAKING PROCESSES

(75) Inventors: Edward L. Cochran, Minneapolis, MN (US); Todd P. Carpenter, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 532 days.

(21) Appl. No.: 10/634,091

(22) Filed: Aug. 4, 2003

(65) Prior Publication Data

US 2005/0033710 A1 Feb. 10, 2005

(51) Int. Cl.
*G05N 5/00* (2006.01)

(52) U.S. Cl. .............................. 706/45; 800/12; 702/76; 424/725

(58) Field of Classification Search .................. 283/67; 434/235; 705/10; 706/45; 800/12; 702/76; 424/725
See application file for complete search history.

(56) References Cited

U.S. PATENT DOCUMENTS

| | | | | |
|---|---|---|---|---|
| 4,866,634 | A | 9/1989 | Reboh et al. ................ | 364/513 |
| 4,947,322 | A | 8/1990 | Tenma et al. ................ | 364/401 |
| 5,224,204 | A | 6/1993 | Tsuruta et al. ................ | 395/51 |
| 5,313,560 | A | 5/1994 | Maruoka et al. .............. | 395/54 |
| 5,406,477 | A | 4/1995 | Harhen ........................ | 364/401 |
| 5,787,283 | A | 7/1998 | Chin et al. ................... | 395/701 |
| 5,809,478 | A | 9/1998 | Greco et al. .................... | 705/4 |
| 5,953,707 | A | 9/1999 | Huang et al. .................. | 705/10 |
| 6,064,968 | A | 5/2000 | Schanz et al. .................. | 705/1 |
| 6,064,998 | A | 5/2000 | Zabloudil et al. ............. | 706/45 |
| 6,125,358 | A | 9/2000 | Hubbell et al. ................ | 706/11 |
| 6,132,724 | A * | 10/2000 | Blum ......................... | 424/725 |
| 6,247,005 | B1 | 6/2001 | Edwards et al. .............. | 706/47 |
| 6,549,861 | B1 * | 4/2003 | Mark et al. ................... | 702/76 |
| 6,607,389 | B2 * | 8/2003 | Genevie ..................... | 434/235 |
| 6,623,040 | B1 * | 9/2003 | Foley et al. .................. | 283/67 |
| 6,658,391 | B1 * | 12/2003 | Williams et al. .............. | 705/10 |
| 6,717,031 | B2 * | 4/2004 | Games et al. ................. | 800/12 |

OTHER PUBLICATIONS

Baumgartner, K. C., "Bayesian Network Modeling of Offender Behavior for Criminal Profiling", http//www.fred.mems,duke.edu/projects/crime/papers/cpfinaltruely.pdf.
Deadman, D. , "Forecasting Residential Burglary", *International Journal of Forecasting*, No. 19, (2003),567-578.

(Continued)

*Primary Examiner*—Wilbert L Starks, Jr.
(74) *Attorney, Agent, or Firm*—Kris T. Fredrick (57) ABSTRACT

A computer implemented method of predicting decisions uses the knowledge of one or more individuals. The individuals, referred to as a team, are knowledgeable about the domain in which decisions are being made. The team individually rates the importance of decision criteria they deem relevant. They then rate the extent which multiple problem characteristics are deemed relevant to the decision. The ratings are subjected to automated quantitative analysis for consistency, and the raters may discuss and modify inconsistent ratings if appropriate. Once the ratings are accepted, the raters then rate the decision options against the highest scoring problem characteristics as determined in the initial ratings. After one or more further rounds of consistency evaluations, the highest rated options are selected as the prediction of the decision to made by the adversary.

18 Claims, 12 Drawing Sheets

OTHER PUBLICATIONS

Brown, C., et al., *Introduction to Artificial Intelligence and Expert Systems*, (1993),pp. 1-15.

"Alberta Solicitor General and Criminal Intelligence Service Alberta: Organized and Serious Crime Initiatives", *Business Plan*—Apr. 2002 to Mar. 2005, http://www.cisalberta.ca/2002-5%20Business%20Plan.pdf#search=%22Alberta%20Solicitor%20General%20and%20Criminal%20Intelligence%20Service%20Alberta%3A%20Organized%20and%20Serious%20Crime%20Initiatives%22,(Jun. 3, 2002), 1-27.

Buckshaw, Donald L., et al., "Mission Oriented Risk and Design Analysis of Critical Information Systems", *IDI Technical Report* Feb. 2004. Contract No. MDA904-02-D-0402, (2004),1-42.

Cirafici, John L., "Closing the Barn Door—Installation Force Protection", *Joint Force Quarterly*, (Spring, 2002),89-93.

Stoneburner, Gary, et al., "Risk Management Guide for Information Technology Systems", *NIST—National Institute of Standards & Technology—Special Publication 800-30*, (Jul. 2002),1-55.

Strang, Steven J., "Project SLEIPNIR: An Analytical Technique for Operational Priority Setting.", *2005 International Conference on Intelligence Analysis*, (2005),1-5.

* cited by examiner

| OPERATIONS GOAL | IMPORTANCE | KILL CIVILIANS | KILL MILITARY | DAMAGE THINGS THAT ARE EXPENSIVE TO REPAIR | ATTACK BASIC HUMAN NEEDS | ATTACK HAS FOLLOW-ON (PULL-THROUGH, KNOCK) | DAMAGE MILITARY INDUSTRIAL COMPLEX | REDUCE CONSUMER COMFORTS | ATTACK MAKES GREAT | ATTACK DEMONSTRATES | M |
|---|---|---|---|---|---|---|---|---|---|---|---|
| DESTABILIZE US ECONOMY | 9.13 | 5.75 | 3.38 | 6.50 | 6.50 | 3.38 | 7.13 | 1.88 | 2.88 | 1.13 | 6.75 |
| INHIBIT US ABILITY TO WAGE WAR | 6.38 | 3.13 | 6.00 | 3.88 | 3.13 | 7.25 | 1.38 | 1.25 | 2.13 | 1.13 | 5.50 |
| DESTABILIZE US POLITICAL SYSTEM | 8.38 | 5.75 | 5.00 | 6.75 | 5.50 | 4.50 | 4.88 | 4.63 | 4.38 | 3.13 | 6.50 |
| SWAY INTERNATIONAL OPINION | 6.25 | 5.38 | 4.25 | 1.88 | 2.75 | 3.63 | 2.13 | 4.13 | 5.75 | 3.75 | 5.25 |
| FORCE US TO CONCEDE KEY ISSUES | 6.13 | 3.75 | 2.50 | 3.63 | 3.75 | 2.50 | 2.25 | 2.88 | 3.38 | 1.25 | 3.13 |
| INCREASE PERCEPTION OF ROLE AS LEADER OF JIHAD | 5.75 | 5.00 | 6.75 | 4.25 | 4.00 | 4.75 | 1.13 | 5.25 | 6.50 | 6.50 | 4.50 |
| WEAKEN PUBLIC'S FAITH IN US LEADERSHIP | 6.88 | 7.25 | 6.50 | 5.50 | 3.88 | 5.75 | 4.25 | 6.25 | 4.00 | 2.63 | 6.75 |
| DIVIDE ALLIES | 6.13 | 3.00 | 2.38 | 2.25 | 5.75 | 3.63 | 1.75 | 4.00 | 2.63 | 1.38 | 3.13 |
| CAUSE 24-7 NEWS COVERAGE | 4.13 | 6.00 | 5.25 | 7.25 | 6.25 | 5.00 | 3.13 | 8.25 | 5.75 | 3.75 | 7.50 |
| DEFLATE US ARROGANCE | 5.75 | 5.00 | 5.00 | 4.75 | 5.25 | 4.25 | 3.38 | 5.13 | 3.63 | 2.50 | 5.75 |
| | | | | | | | | | | | |
| RELATIVE IMPORTANCE/AVG S.D. | 327.58 | 311.63 | 302.23 | 307.72 | 299.27 | 286.78 | 220.38 | 268.36 | 258.55 | 168.39 | 358.47 |
| RANK ON RELATIVE IMPORTANCE | 22 | 2 | 3 | 5 | 4 | 6 | 8 | 16 | 11 | 13 | 18 | 1 |
| CORRELATION OF RATER TO ITEM AVG. | 0.52 | 0.46 | 0.54 | 0.40 | 0.55 | 0.50 | 0.49 | 0.60 | 0.64 | 0.44 | 0.73 | 0.49 |

FIG. 8

| RANK | # | KILL CIVILIANS | DAMAGE THINGS THAT ARE EXPENSIVE TO REPAIR | ATTACK BASIC HUMAN NEEDS | MULTIPLE SIMULTANEOUS ATTACKS | ATTACK HAS FOLLOW-ON ... EFFECTS | KILL MILITARY | DAMAGE MILITARY INDUSTRIAL COMPLEX | ATTACK DEMONSTRATES RUTHLESSNESS | ATTACK ICONS | NEWS |
|---|---|---|---|---|---|---|---|---|---|---|---|
| 2 | 1 | 1.00 | 0.54 | 0.50 | 0.50 | 0.40 | 0.36 | 0.33 | 0.50 | 0.43 | 0.42 |
| 5 | 3 | 0.54 | 1.00 | 0.58 | 0.51 | 0.52 | 0.32 | 0.34 | 0.18 | 0.26 | 0.31 |
| 4 | 4 | 0.50 | 0.58 | 1.00 | 0.62 | 0.61 | 0.42 | 0.43 | 0.27 | 0.42 | 0.44 |
| 1 | 11 | 0.50 | 0.51 | 0.62 | 1.00 | 0.45 | 0.46 | 0.35 | 0.30 | 0.40 | 0.43 |
| 6 | 5 | 0.40 | 0.52 | 0.61 | 0.45 | 1.00 | 0.18 | 0.40 | 0.10 | 0.39 | 0.30 |
| 3 | 2 | 0.36 | 0.32 | 0.42 | 0.46 | 0.18 | 1.00 | 0.57 | 0.37 | 0.39 | 0.37 |
| 8 | 6 | 0.33 | 0.34 | 0.43 | 0.35 | 0.40 | 0.57 | 1.00 | 0.16 | 0.25 | 0.30 |
| 13 | 9 | 0.50 | 0.18 | 0.27 | 0.30 | 0.10 | 0.37 | 0.16 | 1.00 | 0.45 | 0.58 |
| 10 | 16 | 0.43 | 0.26 | 0.42 | 0.40 | 0.39 | 0.39 | 0.25 | 0.45 | 1.00 | 0.65 |
| 9 | 19 | 0.42 | 0.31 | 0.44 | 0.43 | 0.30 | 0.37 | 0.30 | 0.58 | 0.65 | 1.00 |

KILL CIVILIANS
DAMAGE THINGS THAT ARE EXPENSIVE TO REPAIR
ATTACK BASIC HUMAN NEEDS
MULTIPLE SIMULTANEOUS ATTACKS
ATTACK HAS FOLLOW-ON ... EFFECT
KILL MILITARY
DAMAGE MILITARY INDUSTRIAL COMPLEX
ATTACK DEMONSTRATES RUTHLESSNESS
ATTACK ICONS
NEWSWORTHINESS

MODELING DECISION MAKING PROCESSES

FIELD OF THE INVENTION

The present invention relates to decision making, and in particular to modeling decision making processes to predict actions by others whether or not they participate in the process.

BACKGROUND OF THE INVENTION

Prior attempts at determining what people will decide when presented with a decision to make involve combinations of intuition, individual biases or probabilistic assessments. Individuals or groups may consider the multiple factors related to the decision to be made in trying to determine what decision will be made. In the case of groups, voting on the likely decision may be used to arrive at an answer. There is a need for a method to provide a more accurate assessment of the likely decision to be made.

Such a method may be used to identify potential likely actions by criminals and terrorist groups, as well as identifying other types of decisions.

SUMMARY OF THE INVENTION

A method of predicting decisions uses the knowledge of one or more individuals. The individuals, referred to as a team, are knowledgeable about the domain in which decisions are being made. The team individually rates the importance of each decision criterion they deem relevant. They then rate the extent which multiple problem characteristics are deemed relevant to each decision criterion. The ratings are subjected to quantitative analysis to assess their consistency and to highlight differences of opinion, and the raters may discuss and modify inconsistent ratings if appropriate. Once the ratings are accepted, the raters then rate the extent to which each of the known decision options fulfills the highest scoring decision criteria as determined in the initial ratings. After one or more further rounds of consistency evaluations, and subsequent discussion, the highest rated options are selected as the best prediction by this team of the decision to be made. The method permits a range of varied opinions to be entered, weighted, and automatically combined to obtain a consensus prediction of the decision to be made. The method treats variability in the opinions of raters not as noise but as useful information in making predictions, and avoids individual biases or probabilistic assessments.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be used and that structural, logical and electrical changes may be made without departing from the scope of the present invention. The following description is, therefore, not to be taken in a limited sense, and the scope of the present invention is defined by the appended claims.

The functions or algorithms described herein can be implemented as a set of procedures, or as computer software, or as a combination of software and human implemented procedures in one embodiment. If used, the software comprises computer executable instructions stored on computer readable media such as memory or other type of storage devices. Multiple functions are performed in one or more modules as desired, and the embodiments described are merely examples. The software is executed on a digital signal processor, ASIC, microprocessor, or other type of processor operating on a computer system, such as a personal computer, server or other computer system.

The present invention imposes a rigorous, documented, and principled process in group discussions involving the prediction of decisions and actions. Whereas existing decision making tools such as decision component weighting and quality function deployment have been used to help a group make a decision, this process is used to guide the group to predict the actions of others by systematically considering all of the potentially relevant decision criteria and outcome characteristics. Further, this process does not require group consensus, and instead permits group judgments to be derived from weighted combinations of the beliefs of the members of the group.

Figure 1:
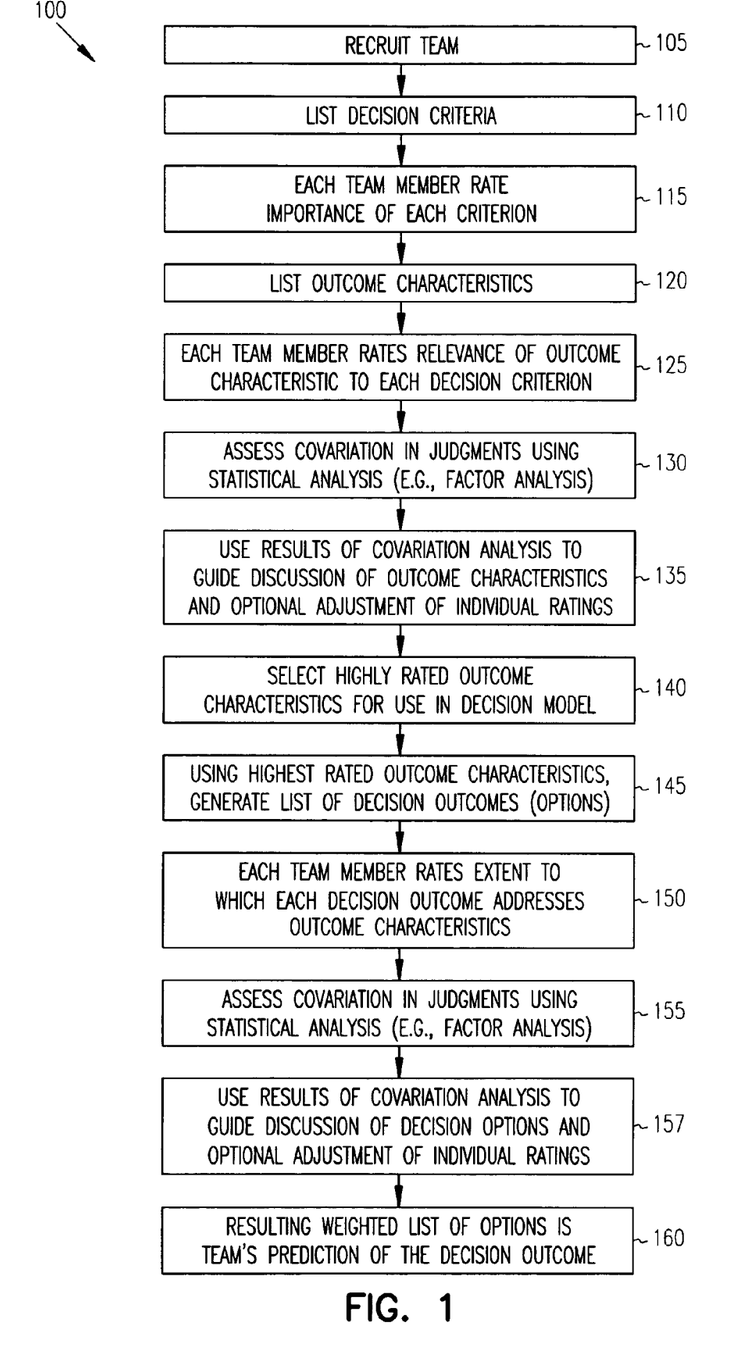
FIG. 1 is a flowchart of a process for predicting decisions of others in one example embodiment.

In one embodiment, a series of interconnected spreadsheets are used to guide the entry of a range of varied opinions, which are individually assessed and then automatically combined to obtain a consensus prediction of a decision to be made. An example of such a decision involves predicting which targets are most likely to be attacked by different attacking each with their own goals and means generally at 100. Examples of spreadsheets and data presentations used in the process are shown in following figures.

A team of individuals knowledgeable about the decision maker and the decision domain ("experts") is recruited at 105. Diversity in the opinions of these experts is valued. In this example, such a team would have some knowledge of issues that would be considered by the attackers, such as their goals and the means available to them to carry out those goals.

The team is instructed to list the decision criteria—the issues that will be considered by the person(s) making the decision—at 110. These may be listed as the title of the rows of a matrix on paper or in a spreadsheet. In the present example, the issues could include a list of the goals of the attack (e.g., news coverage, ransom paid), and the operations concerns of the attacker (e.g., financial resources available, the need for the attackers to successfully escape).

At 115, the team is instructed to determine the relative importance of these criteria on a scale from 1 to 10 in one example. Other scales may be used as desired. If there is general agreement, the weights are simply listed in an importance column. If there is disagreement, the average of the weights is used. If it is agreed that the attacker cares more about the success of the attack than the escape of the attackers, for example, attack success will be rated relatively higher, and capture avoidance relatively lower. These ratings may be entered as the second column in each of the relevant rows of a matrix on paper or in a spreadsheet.

The team is then instructed at 120 to identify characteristics of the decision outcome(s) that may be related to the decision criteria. For the current example, these characteristics might include the presence of security systems at the target site, the site's location adjacent to interstate highways that can be used as an escape route, and the number of people required to attack the target site. These are entered as the title of the columns of a matrix on paper or in a spreadsheet. For each of these characteristics, the experts are asked to state how they would be measured, which is added to each description. The units used for representing the measure for each characteristic may be varied as desired. For instance, closeness to escape routes may be measured by driving time in seconds or minutes, etc.

At 125, the team rates the degree to which each of these outcome characteristics is related to a decision criteria, using a 0, 1, 3, 9 rating scale in one embodiment. Each team member produces a rating for each combination of decision criterion and outcome characteristic. Thus, a team member may decide that escape route proximity relates very highly to capture avoidance, but not at all to the amount of ransom paid.

At 130, an analysis of the covariation of the judgments of the team members is completed. For example, in a spreadsheet embodiment, a suite of statistics is calculated and then highlighted on the fly. The variation in expert ratings is reflected in the standard deviation of their ratings for a particular combination of characteristic and criterion. The agreement of experts with each other is reflected in the intercorrelation matrix of rater judgments across criteria and outcome characteristics. These statistics are computed and the variation is highlighted with a color code (green, yellow, red) or other attribute. The experts' average ratings for each combination of characteristic and criterion are computed and placed in the appropriate column. These ratings are then multiplied by the weights determined in 115 to determine scores and overall ranking of each of the decision characteristics, both for individuals and for the team as a whole.

Ratings similarly calculated for each rater are compared to those of the team as a whole. Finally a concordance analysis is carried out to determine the extent to which the rankings of the team as a whole are different from those of the individuals.

These analyses describe the variability in expert judgments and the source of that variability. Three sources of variability in particular are highlighted: errors (e.g., mistakes in generating the ratings), systematic differences of opinion in individual raters, and systematic differences of opinion among groups of raters. Mistakes are quickly and easily corrected, ensuring that following analyses are valid. Differences of opinion may be based upon a lack of mutual understanding of the definitions of the decision criteria, or differences in belief about the salience of those decision criteria in the current context.

The team is instructed to analyze the quantitative data and make appropriate adjustments at 135. Two kinds of adjustments in particular are of interest. Individual experts may, after listening to discussion, determine that their ratings are different from the teams' because the expert's basis for making the rating was inconsistent with those of other ratings. Corrections of this type lead to improved consistency. Alternatively, difference in ratings may reflect real differences in opinion about what will matter in the actual decision process, or uncertainty about what that process entails. These differences, once validated, improve the diversity of coverage of the decision space and are retained. In particular, ratings among subgroups of experts that differ from the ratings of other subgroups of experts represent "schools of thought" that, once discovered, can be analyzed for their underlying assumptions and evidentiary support. Once the analysis is complete, an assessment of the relative importance of each characteristic (e.g., as depicted in a scree plot) is used to determine how many decision characteristics to carry forward to the next stage of the process.

At 140, the validated subset of decision characteristics, and their associated weights, are entered as the titles of rows of a second matrix, which may be embodied in a second spreadsheet. These are treated henceforth as the weighted decision criteria for selecting among individual options (possible decision outcomes).

The preceding steps result in a decision making model that reflects the raters' mutual understanding of the decision criteria, weightings, and characteristics, and the underlying structure of any differences of opinion that exist among participating experts. This initial process results in a list of decision criteria that is robust, validated, and easy to use.

The experts then generate a list of decision options which is entered at 145 as the titles of columns of the second matrix. For example, a set of specific crime scenarios can be listed. Typically the preceding analysis results in a relatively small list of potential choices, the process does not require it. All of the scenarios for attacking all of the military installations in a region can be entered, if need be. The methods for generating decision options depend on the domain under study, but could include various cause-and-effect analysis tools such as Ishikawa tools, Failure Mode and Effects Analysis (FMEA), or Management of Change tools.

The raters rate the extent to which each of these decision options fulfills the decision criteria using a 0, 1, 3, 9 rating scale at 150. Thus, an attack on an equipment depot may be rated highly on closeness to escape routes and less highly on the impact of the attack on public opinion.

As in 130, a suite of statistics is calculated at 155, and is reviewed by the rating team at 157.

The resulting ordered list of options 160 is the process' prediction of the most likely outcome of the decision. Further, the difference in scores of each option provides an index of the probability of the prediction. If an attack on a military depot has a much higher score than any other alternative, then the tool is indicating that this is the most likely decision from the list that has been subjected to analysis.

Figure 2:
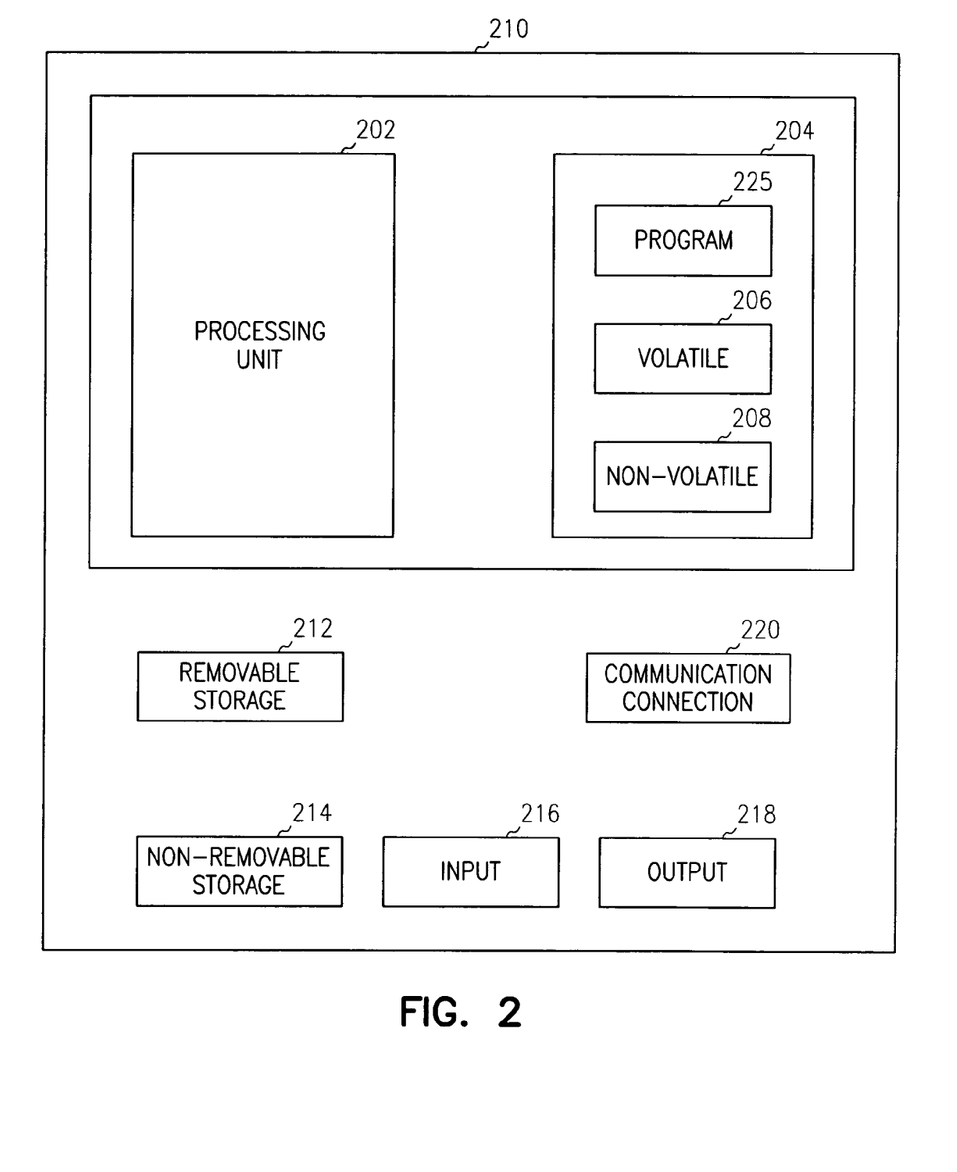
FIG. 2 is a simplified block diagram of a computer system for executing at least portions of the process of FIG. 1.

A block diagram of a computer system that may be used to execute at least portions of the above algorithm, such as covariance analysis on expert judgments in matrices, is shown in FIG. 2. Any type of spreadsheet-based application may be used. The functions may also be programmed directly into a stand-alone application if desired. A general computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a computer-readable medium. For example, a computer program 225 capable of providing a generic technique to perform access control check for data access and/or for doing an operation on one of the servers in a COM based system according to the teachings of the present invention may be included on a CD-ROM and loaded from the CD-ROM to a hard drive. The computer-readable instructions allow computer system 200 to provide generic access controls in a COM based computer network system having multiple users and servers.

Figure 3:
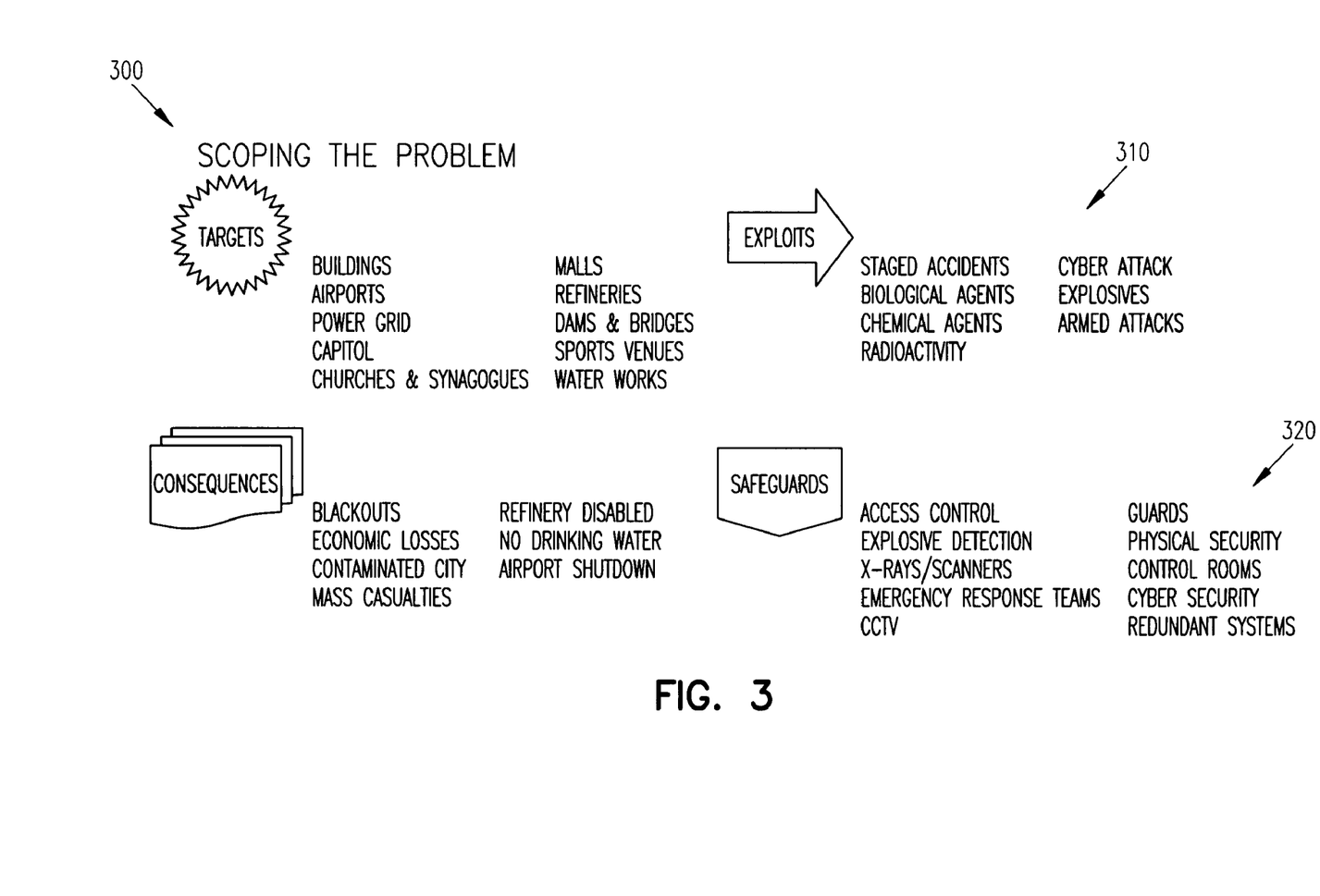
FIG. 3 is a depiction of the characteristics of a complex domain requiring the protection of critical infrastructure and the prediction of attack scenarios.

FIG. 3 is a block diagram of a more complex domain illustrating scoping of the problems associated with protecting critical infrastructure from attacks. Those charged with defending critical infrastructure may tend to focus on the infrastructure they own or control, or upon scenarios they personally believe see are particularly risky, or upon installations they believe are poorly protected. However, the protection task can not be systematically addressed based on such individual judgments. There are thousands of potential targets 300, and hundreds of vulnerabilities per target. Such targets include buildings, malls, airports, power grids, dams and bridges, capitols, sports venues, synagogues, and water works to name a few. It is simply not feasible to eliminate every vulnerability at every potential target.

The consequences 330 of attacks on these targets should also be considered. Such consequences include blackouts, economic losses, contaminated cities, refinery disabled, mass casualties, airport shutdown and no drinking water to name a few. These potential consequences are not likely to be fully understood by the defenders, nor equally valued by an adversary.

There are also many different attacks or exploits 310 that can be carried out against each of the targets' vulnerabilities. Common exploits include cyber attack, staged accidents, explosives, biological agents, armed attacks, chemical agents and radioactivity. While there are protective measures or safeguards 320 that may be implemented, such as access control, guards, physical security, explosive detection, x-rays/scanners, control rooms, cyber security, emergency response teams, closed circuit TV and redundant systems, these all take resources to implement and none of them is comprehensively effective. It is apparent that resources to provide safeguards against all possible exploits for all possible targets are simply not available.

Figure 4:
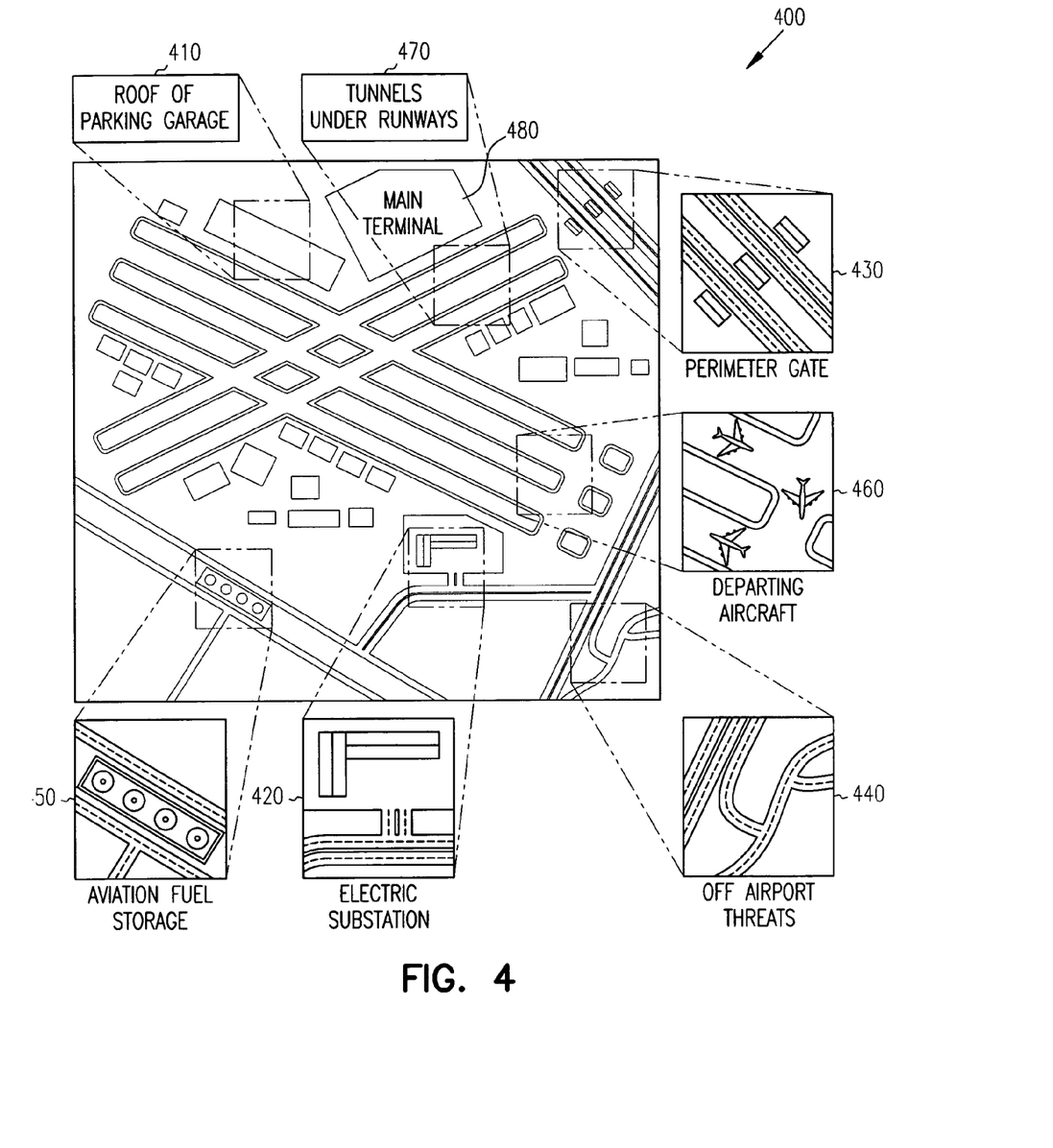
FIG. 4 is a top view of a potential target identifying specific threats.

FIG. 4 is an example of a potential target identifying specific attacks, each of which may have multiple methods. Given a target, such as an airport 400, there are several features most likely to be involved in an attack. Such features include parking garages 410, electric substations 420, perimeter gate 430, off airport threats 440, aviation fuel storage 450, departing aircraft 460 and tunnels under runways 470, not to mention the main terminal 480. It is difficult to determine which feature is most likely to be attacked.

Figure 5:
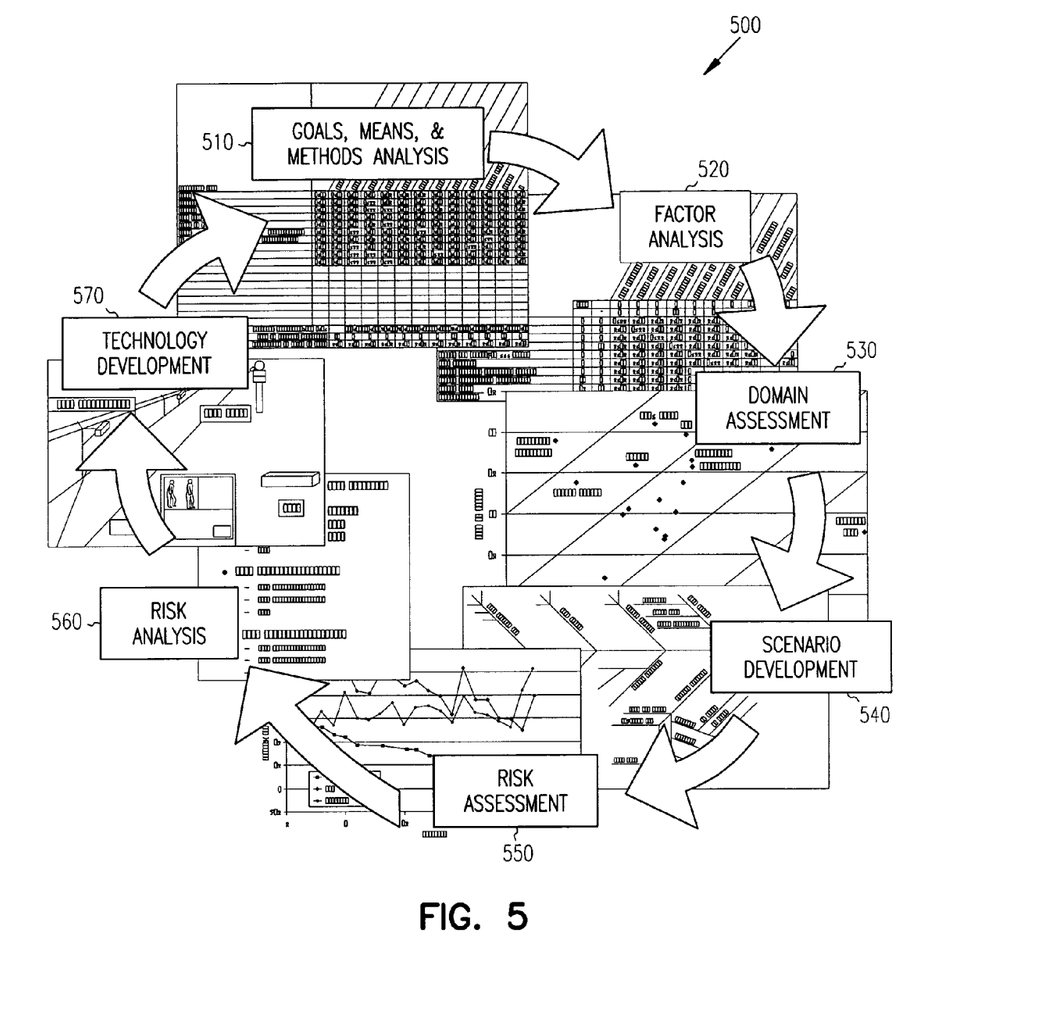
FIG. 5 is a block diagram of a decision process for predicting a decision.

FIG. 5 is a block diagram of a decision process instantiated for an airport scenario in accordance with the method of FIG. 1 at 500. A formal, iterative method is implemented for combining the assessments of multiple experts to assess risk. The experts use the potential attackers' perspective. The method permits revalidation and reassessment as data arrive, and enables identification of countermeasures, even for unpredicted attack scenarios.

The adversary may not themselves understand the details of their decision process; it has to be estimated based on available data. This leads to an approach that start with first principles—what is the motivation?—and only then gets to intermediate goals and execution strategies. The process is iterative, because the experts leverage and refine each other's understanding. Even with a lack of consensus on the big picture, there can be consensus on important threads such as specific vulnerabilities and defenses. Differences of opinion will be identified and quantified, leading to either discussion and resolution, or the generation of alternative scenarios. The high level block diagram 500 shows multiple elements that are shown in further detail in following figures. First, a goals, means and methods analysis 510, corresponding to blocks 105 through 125, is performed, followed by a factor analysis 520, corresponding to 130-135. This leads to a domain assessment 530 (135-140), scenario development 540 (145), risk assessment 550 (150-155), risk analysis 560 (157-160) and technology development 570 to reduce the risk. 570 is representative of the results of the process. The elements are arranged in a circle with arrows between the elements to represent the iterative nature of the vulnerability function assessment.

Figure 6:
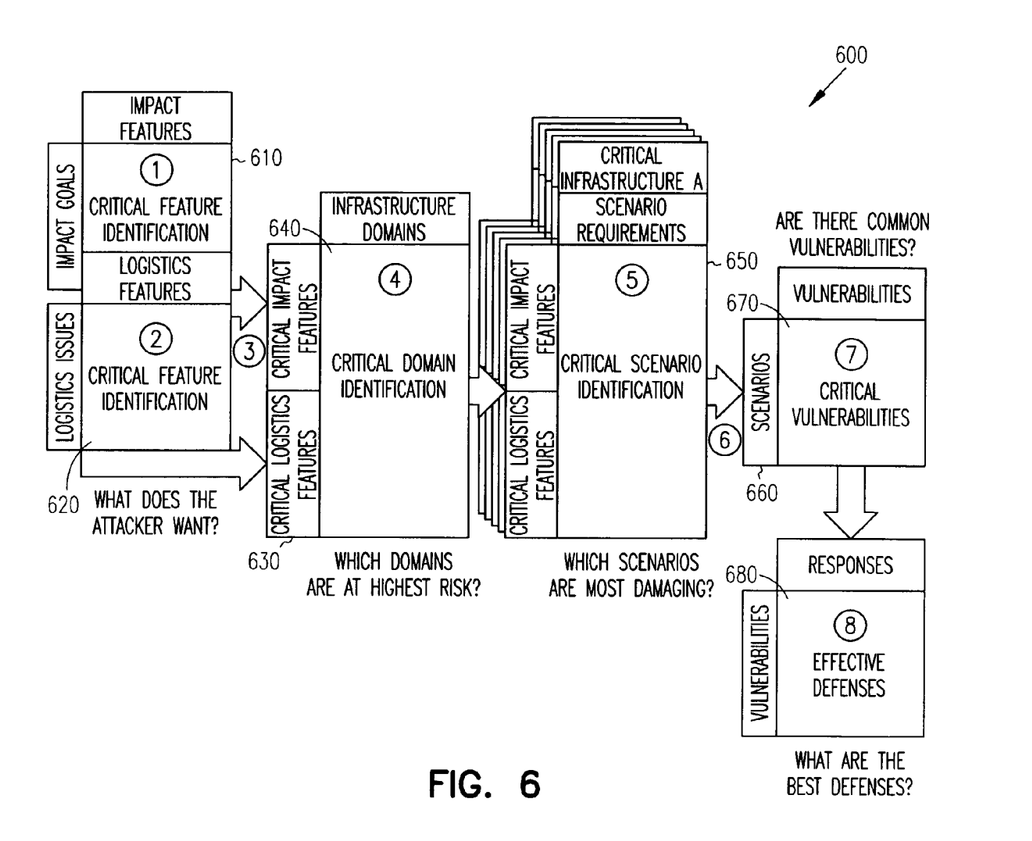
FIG. 6 is a block diagram of a process for identifying defenses.

FIG. 6 is a block diagram 600 showing further detail of selected blocks of FIG. 5. A systematic analysis is performed at each of multiple stages, each building on the preceding analysis. The method incorporates logistics concerns as well as the impact of the goals of the actions. Bias of the target's owners is reduced.

Impact features and impact goals are considered in the team identifying critical features 610. Logistic features and issues are also considered at 620. 610 and 620 correspond to 510. At 630 (520), the identified critical impact features and critical logistics features are used to identify critical domains at 640 (530) to identify critical infrastructure domains at risk. Critical scenarios and requirements for the scenarios are generated for multiple critical infrastructures at 650 (540). Vulnerabilities for each scenario 660 (550) are then identified at 670 (560) along with responses at 680 (570), identifying the best defenses.

Figure 7:
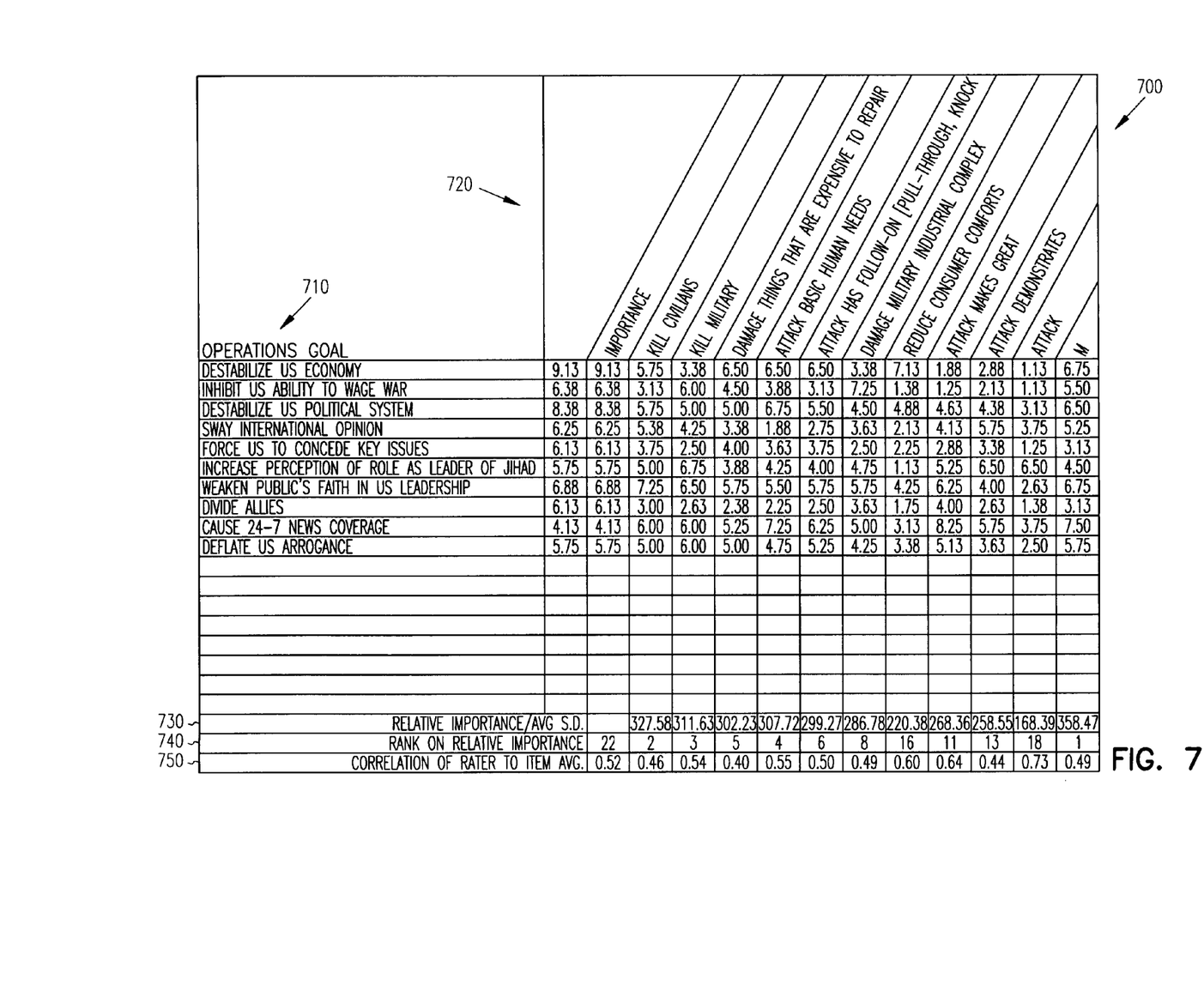
FIG. 7 is a chart illustrating an analysis of the extent to which various decision criteria associated with the goals of the decision maker are met by various outcome characteristics.

FIG. 7 is a chart 700 illustrating the systematic assessment of impact of an action on the potential targets. It provides further detail corresponding to 610/510. The analysis is sensitive to tangible and intangible goals. The chart is an illustration of a spreadsheet that provides several operations goals in a first column 710, such as destabilization of the US economy, inhibit US ability to wage war, destabilize US political system, etc. Multiple columns 720 are then provided for assessing the impact of particular results of actions, such as killing civilians, killing military personnel, damaging things that are expensive to repair, etc. A row 730 then provides a relative importance measurement for each such impact, and the impacts are ranked on relative importance at 740. A correlation of the rater to each relative importance measurement is then provided at 750 for feedback to the rater.

Figure 8:
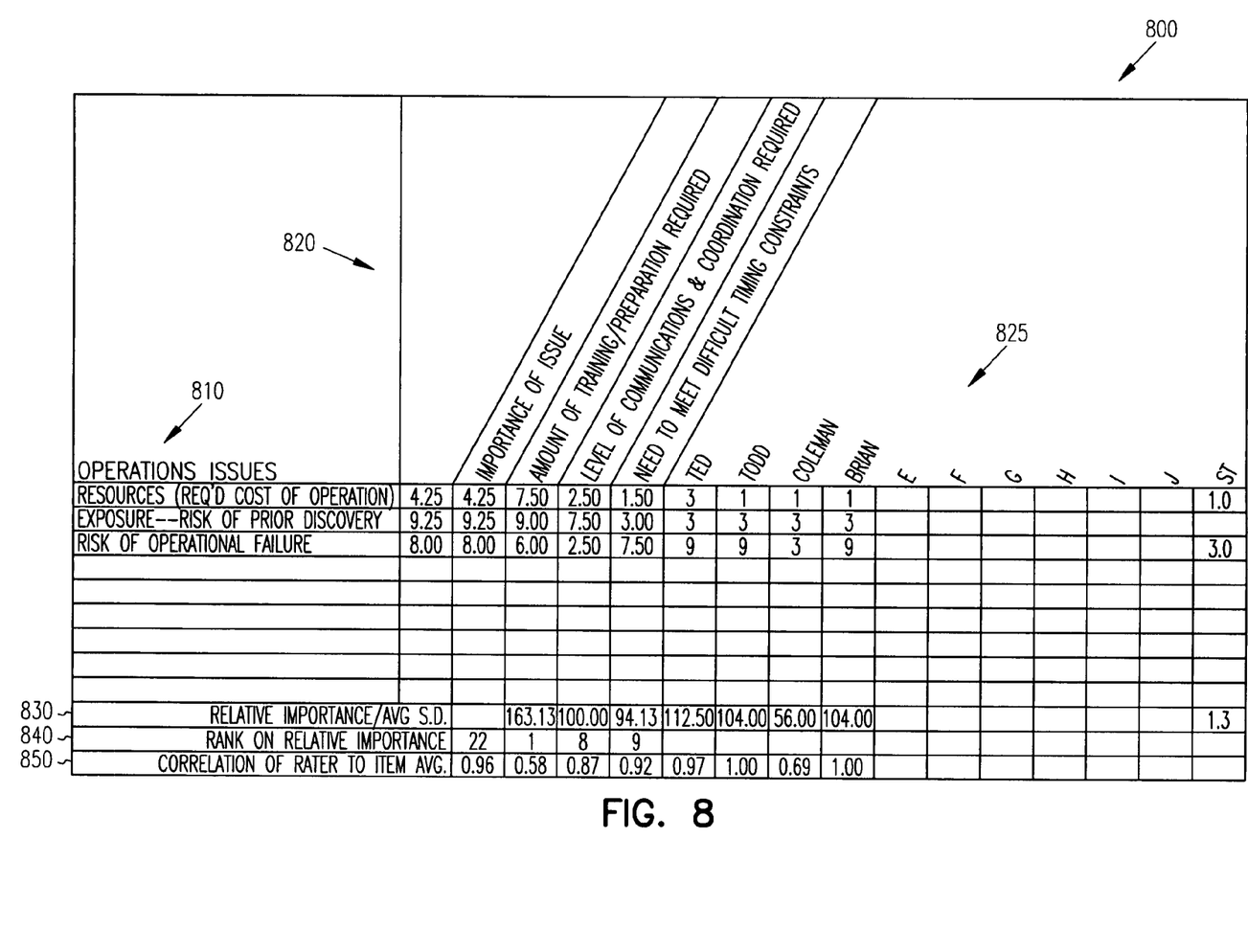
FIG. 8 is a chart illustrating an analysis of the extent to which various decision criteria associated with the capabilities of the decision maker are met by various outcome characteristics.

FIG. 8 is a chart 800 illustrating logistics associated with operations issues. It provides further detail corresponding to 620/510. Important operations issues are shown in a column 810, and include issues such as the cost of the operation, the risk of discover and probability of success. At row 820, several logistics are presented that are related to the operations issues, such as amount training/preparation required, level of communication and coordination required and need to meet difficult timing constraints. The team members, or raters rank each these at 825, and a relative importance measurement is calculated at 830. A rank on relative importance is then provided at 840, and a correlation of the rater to the item average is provided at 850.

Figure 9:
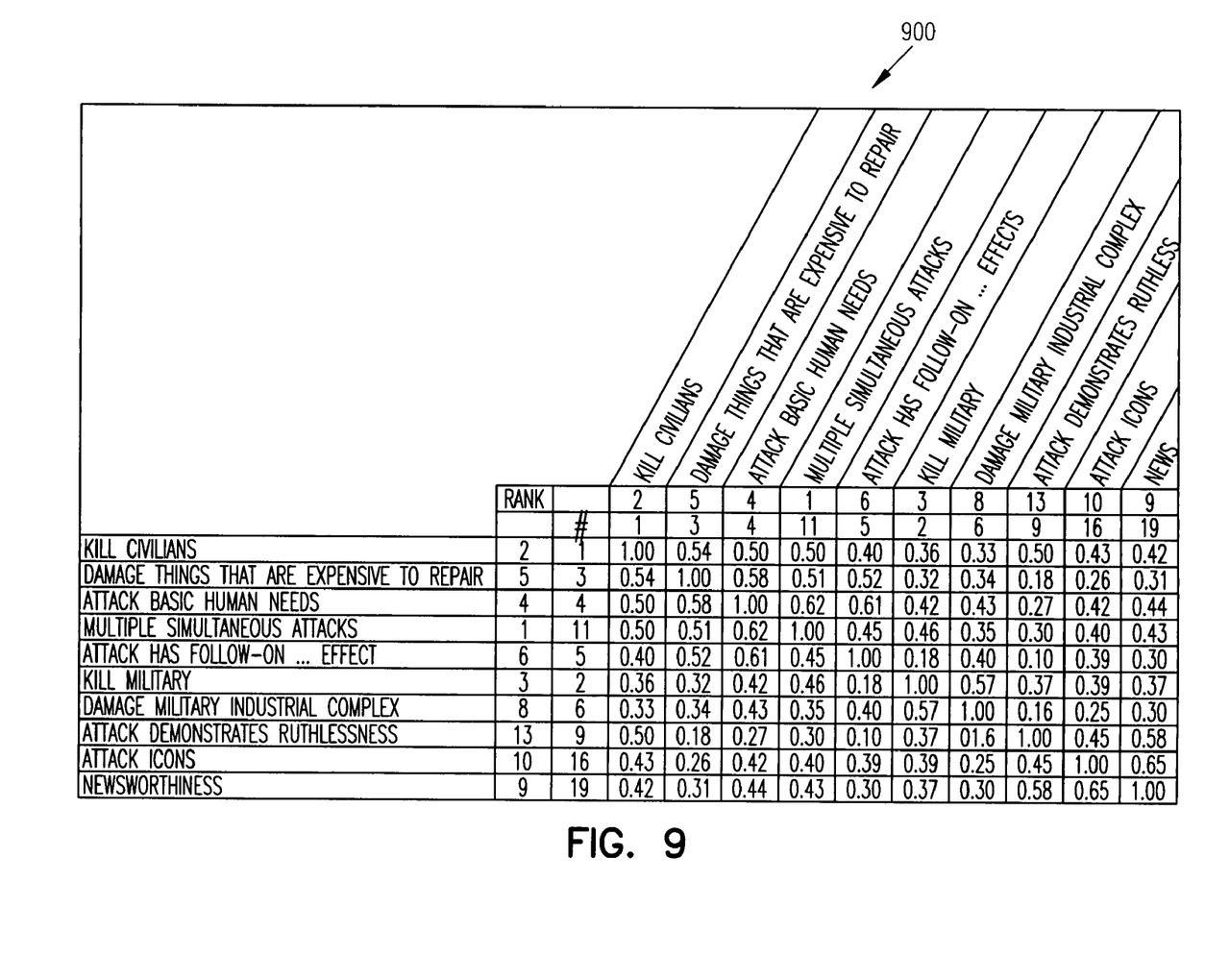
FIG. 9 is a chart illustrating the use of covariation analysis to create ratings scales for factors associated with the decisions.

FIG. 9 is a chart 900 illustrating the creation of ratings scales for factors associated with the decisions. It provides further detail corresponding to 630/520. In one embodiment a cluster analysis, or other analysis is used to remove duplicative scales and collapse the analysis to core issues. In effect, the most important factors are identified, redundancy is reduced, and measurable criteria are developed by this analysis.

Figure 10:
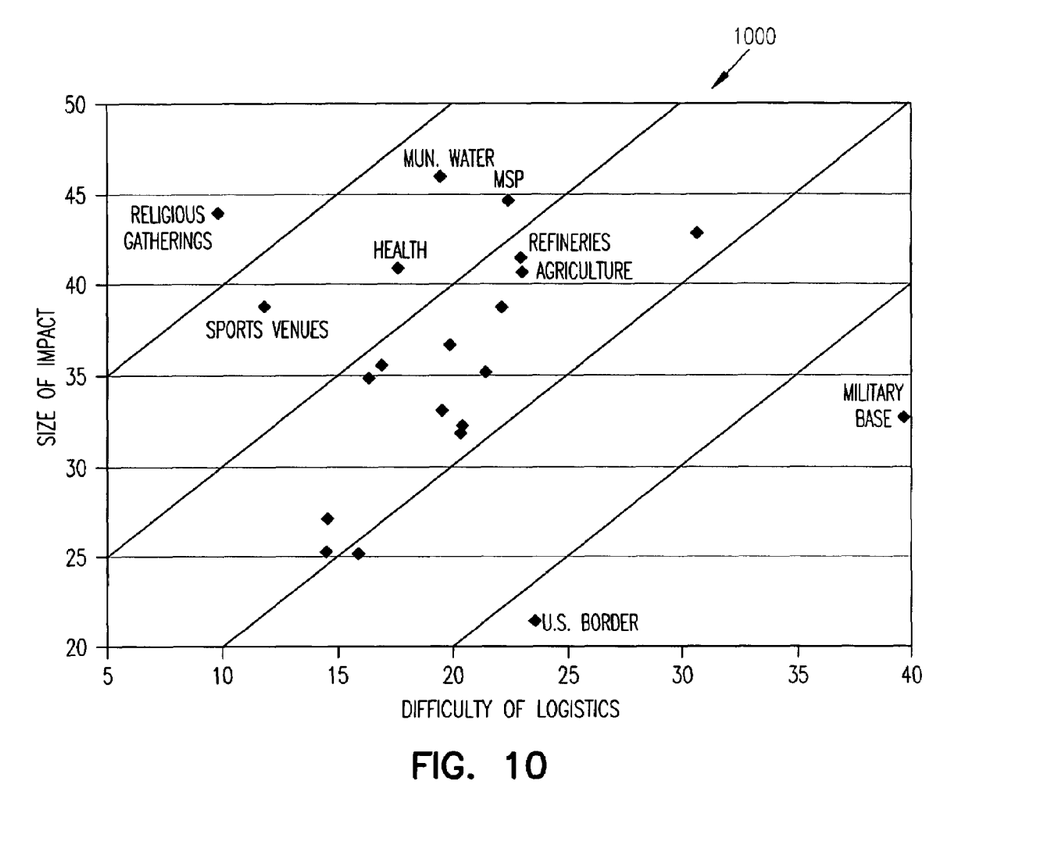
FIG. 10 is an example plot illustrating prioritization of threat domains based on difficulty of logistics versus size of the impact.

FIG. 10 is a plot 1000 illustrating prioritization of threat domains based on difficulty of logistics versus size of the impact. It provides further detail corresponding to 640/530. To get to this point, the scales are used to rate the domains on those scales. Domains are rated by worst-case scenarios. Results are likely to change through an iteration or two. Surprises are likely here, and represent the success of the process in reflecting the aims of the attacker instead of our own expectations. In one example, religious gatherings came out with a high impact, with a low difficulty of logistics, while a military base had a high difficulty of logistics, yet a relatively low impact.

Figure 11:
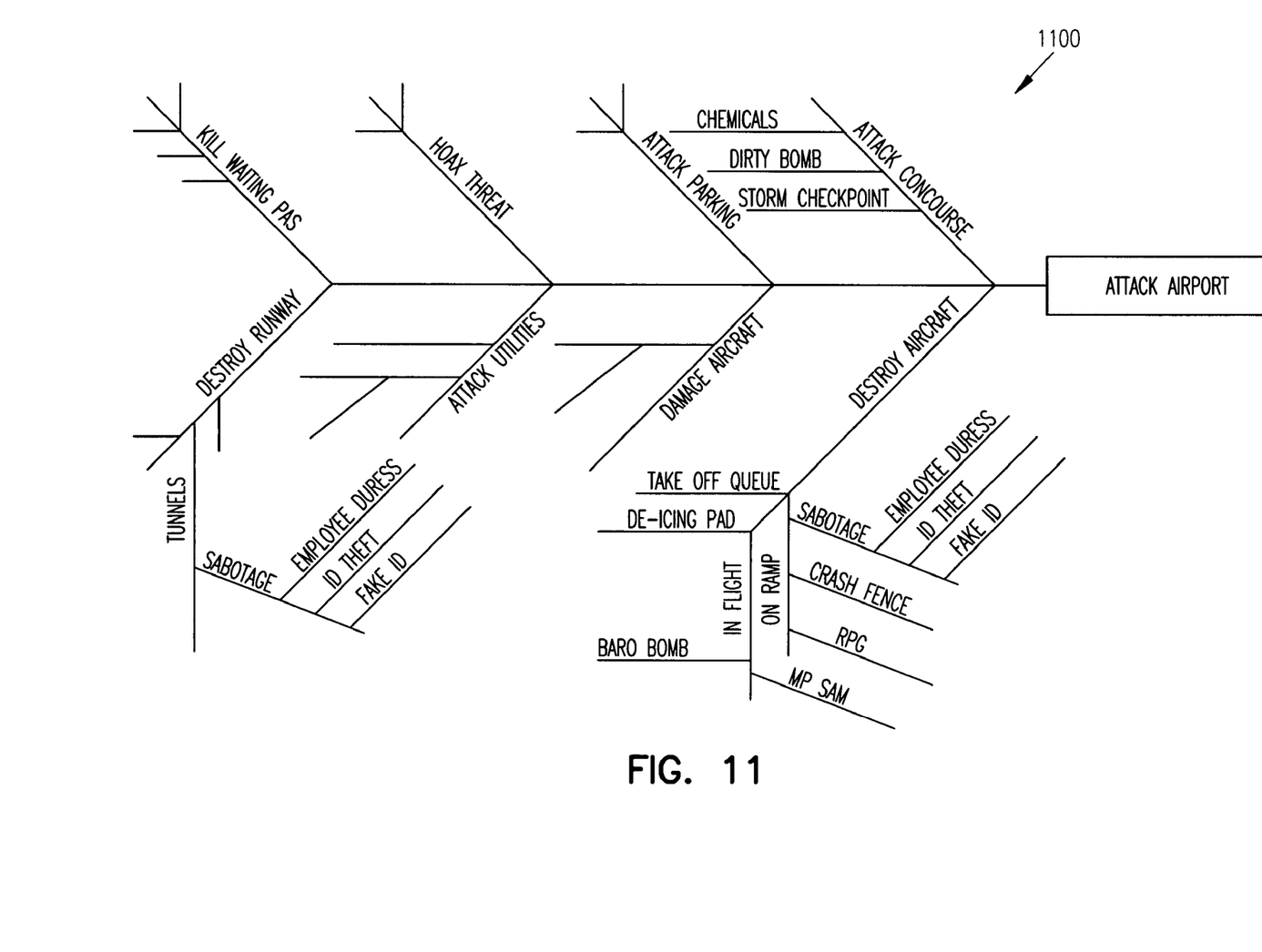
FIG. 11 illustrates the use of an Ishikawa diagram to support scenario development for attacking specific targets.

FIG. 11 is an Ishikawa diagram illustrating scenario development in attacking a target such as an airport. It provides more detail corresponding to 650/540. It uses simulated data for illustration purposes only. The diagram presents a systematic method for developing scenarios, driven by cause-effect analysis, but also includes impact attributes (e.g., stealthy vs. spectacular attacks).

Figure 12:
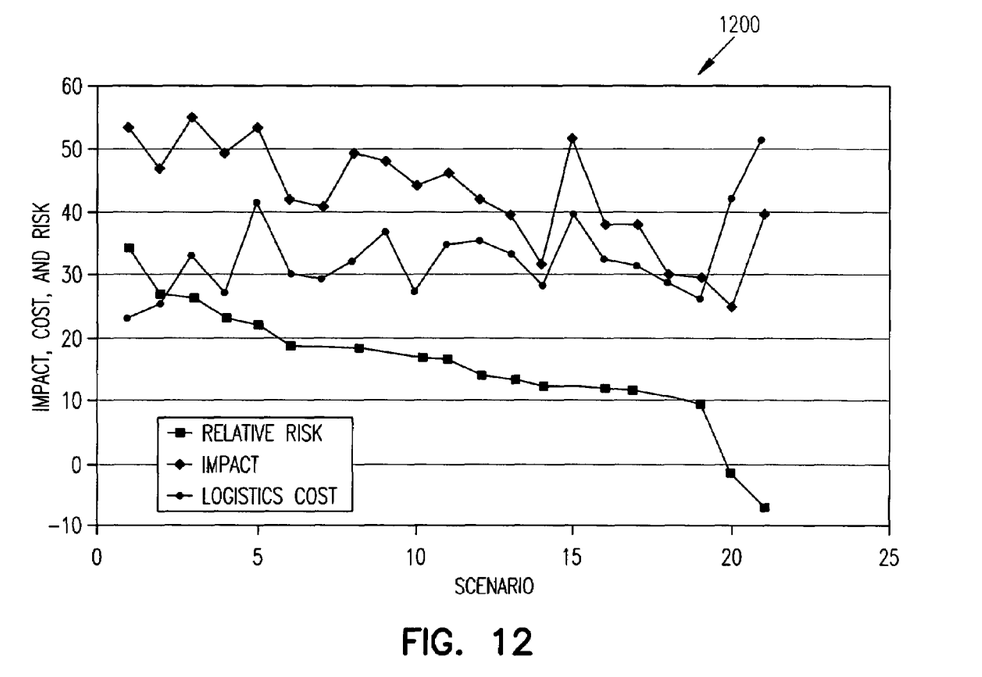
FIG. 12 is a Pareto chart illustrating overall threat of attack for a target based on relative risk, impact and logistics cost.

FIG. 12 is a Pareto chart 1200 illustrating overall threat of attack for a target based on relative risk, impact and logistics cost. It provides more detail corresponding to 660/550. The goal is not so much to perfectly predict every attack (although clearly the devastating scenarios need to be responded to), but to identify common vulnerabilities to efficiently utilize resources in protecting such vulnerabilities.

The invention claimed is:

1. A method using a team of individual raters to generate a decision making model for predicting decisions, the method comprising:
   identifying possible motivations of a decision maker;
   entering a variety of opinions about a strength of such motivations;
   weighting the motivations;
   combining the weights to create a decision making model;
   identifying possible decision outcomes; and
   assessing the possible decision outcomes with respect to the decision making model.

2. The method of claim 1 and further comprising:
   generating a list of decision options;
   the raters rating the extent to which each of these decision options meets their opinions;
   calculating a suite of statistics for review by the team;
   generating an ordered list of options as a prediction of the most likely outcome of the decision process.

3. The method of claim 2 wherein differences of opinion on each option provides an index of the uncertainty of the prediction.

4. The method of claim 3 and further comprising incorporating logistics factors.

5. A computer implemented method using a team to generate a decision making model for predicting decisions, the method comprising:
   identifying issues likely to be considered in making a decision in a decision domain;
   determining relative importance of the identified issues;
   identifying characteristics of issues related to making a decision;
   individually rating the degree to which the characteristics are related to making the decision;
   determining rankings of individuals and team identified characteristics; and
   iteratively adjusting individual ratings based on the rankings to generate the decision making model.

6. A method of predicting a decision in a decision domain by another party, the method comprising:
   recruiting a team of individual raters knowledgeable about the decision domain;
   the team listing decision criteria that may be considered by the another party;
   listing outcome characteristics;
   the team rating the relevance of the outcome characteristics to each decision criteria;
   assessing a covariance in ratings using a statistical analysis;
   selecting highly rated outcome characteristics for use in a decision model;
   generating a list of decision outcomes based on highest rated outcome characteristics;
   each team member rating the extent to which each decision outcome addresses the outcome characteristics;
   assessing a covariation in judgments using statistical analysis to produce a weighted list of options corresponding to predictions of the decision.

7. The method of claim 6 and further comprising:
identifying issues likely to be considered in making a decision in a decision domain;
determining relative importance of the identified issues;
identifying characteristics of issues related to making a decision;
individually rating the degree to which the characteristics are related to making the decision;
determining rankings of individuals and team identified characteristics; and
adjusting individual ratings based on the rankings to generate the decision making model.

8. The method of claim 7 and further comprising:
generating a list of decision options;
the raters rating the extent to which each of these decision options meets the decision criteria;
calculating a suite of statistics for review by the team;
generating an ordered list of options as a prediction of the most likely outcome of the decision process.

9. The method of claim 7 wherein difference in scores of each option provides an index of the uncertainty of the prediction.

10. The method of claim 9 and further comprising incorporating logistics factors.

11. The method of claim 6 and further comprising adjusting individual ratings of outcome characteristics based on the covariation analysis of such outcome characteristics.

12. The method of claim 6 and further comprising adjusting individual ratings of decision options based on the covariation analysis of such decision options.

13. The method of claim 6 and further comprising generating a weighted list of options as a prediction of the decision outcome.

14. A computer assisted method using a team to generate a decision making model for predicting decisions, the method comprising:
identifying issues likely to be considered in making a decision in a decision domain;
determining relative importance of the identified issues;
identifying characteristics of issues related to making a decision;
individually rating the degree to which the characteristics are related to making the decision;
determining rankings of individuals and team identified characteristics; and
iteratively adjusting individual ratings based on the rankings to generate the decision making model.

15. A physical computer readable medium having instructions for causing a computer to implement a method using a team of individual raters to generate a decision making model for predicting decisions, the computer implemented method comprising:
recording possible motivations of a decision maker identified by the team of individual raters;
recording a variety of opinions about a strength of such motivations;
weighting the motivations;
combining the weights to create a decision making model stored in memory accessible by the computer;
recording possible decision outcomes identified by the team of individual raters; and
creating a list of the possible decision outcomes with respect to the decision making model and indication of ranking of the possible decision outcomes fixed for recording on physical media for use in determining one or more most likely decisions.

16. A physical computer readable medium having instructions for causing a computer to implement a method using a team of individual raters to generate a decision making model for predicting a most likely target, the computer implemented method comprising:
recording possible motivations of a decision maker identified by the team of individual raters;
recording a variety of opinions about a strength of such motivations;
weighting the motivations;
combining the weights to create a decision making model stored in memory accessible by the computer;
recording possible decision outcomes identified by the team of individual raters; and
creating a list of the possible decision outcomes with respect to the decision making model and indication of ranking of the possible decision outcomes fixed for recording on physical media for use in determining one or more most likely targets, enabling security assets to be efficiently utilized.

17. The computer readable medium of claim 16 wherein the decision making model comprises a plurality of weighted matrices representing motivations and decision outcomes.

18. A computer assisted method of predicting decisions, the method comprising:
using a team such that members on the team list decision criteria that are recorded on memory in the computer;
rating importance of each decision criterion by each member and recording the rating on memory in the computer;
generating a list of outcome characteristics for the decisions;
each member rating a relevance of each outcome characteristic to each decision criterion and recording such relevance on memory in the computer;
assessing a covariation of outcome characteristics using computer implemented statistical analysis;
adjusting member ratings for outcome characteristics as a function of the statistical analysis;
selecting highly rated outcome characteristics;
creating and storing a decision model from such selected highly rated outcome characteristics;
generating a list of decision outcomes from such highest rated outcome characteristics;
each member rating an extent to which each decision outcome addresses such outcome characteristics and recording such rating;
assessing covariation in such ratings using computer implemented statistical analysis;
optionally adjusting member ratings as a function of such covariation analysis; and
generating a weighted list of predicted decisions using the computer adapted for display, transmission or storage.

* * * * *